United States Patent [19]
Burg

[11] Patent Number: 5,839,384
[45] Date of Patent: Nov. 24, 1998

[54] MULTIHULLED PARTIALLY AIR SUPPORTED MARINE VEHICLE

[76] Inventor: Donald E. Burg, 15840 SW. 84th Ave., Miami, Fla. 33157

[21] Appl. No.: 823,891

[22] Filed: Mar. 17, 1997

Related U.S. Application Data

[63] Continuation-in-part of Ser. No. 728,887, Jul. 10, 1991, Pat. No. 5,176,095, and a continuation-in-part of Ser. No. 871,387, Apr. 21, 1992, abandoned, and a continuation-in-part of Ser. No. 151,253, Nov. 12, 1993, Pat. No. 5,415,120, and a continuation-in-part of Ser. No. 283,647, Aug. 1, 1994, abandoned, and a continuation-in-part of Ser. No. 347,859, Dec. 1, 1994, abandoned, and a continuation-in-part of Ser. No. 468,876, Jun. 6, 1995, Pat. No. 5,611,294, and a continuation-in-part of Ser. No. 483,791, Jun. 7, 1995, Pat. No. 5,626,669.

[51] Int. Cl.⁶ ..................................................... B63B 1/38
[52] U.S. Cl. ............................................ 114/67 A; 114/61
[58] Field of Search ...................................... 114/61, 67 A, 114/289, 290, 56

[56] References Cited

U.S. PATENT DOCUMENTS

| 527,511 | 10/1894 | Rooke | 114/56 |
|---|---|---|---|
| 1,307,135 | 6/1919 | Lake | 114/67 A |
| 3,191,572 | 6/1965 | Wilson | 114/67 A |
| 3,606,857 | 9/1971 | Sundquist | 114/67 A |

FOREIGN PATENT DOCUMENTS

| 38 13 105 A1 | 11/1989 | Germany | 114/67 A |
|---|---|---|---|

*Primary Examiner*—Sherman Basinger
*Attorney, Agent, or Firm*—Robert J. Van Der Wall

[57] ABSTRACT

A multihulled partially gas supported marine vehicle that uses artificially pressurized gas cushion recesses in supporting hulls is presented. Definitions of critical bow and recess divergence angles and other parameters are made as well as other features including an angled recess aft seal, side water deflecting steps, and a special propulsor pylon designed to insure that clean air free water is supplied to the propulsory

23 Claims, 3 Drawing Sheets

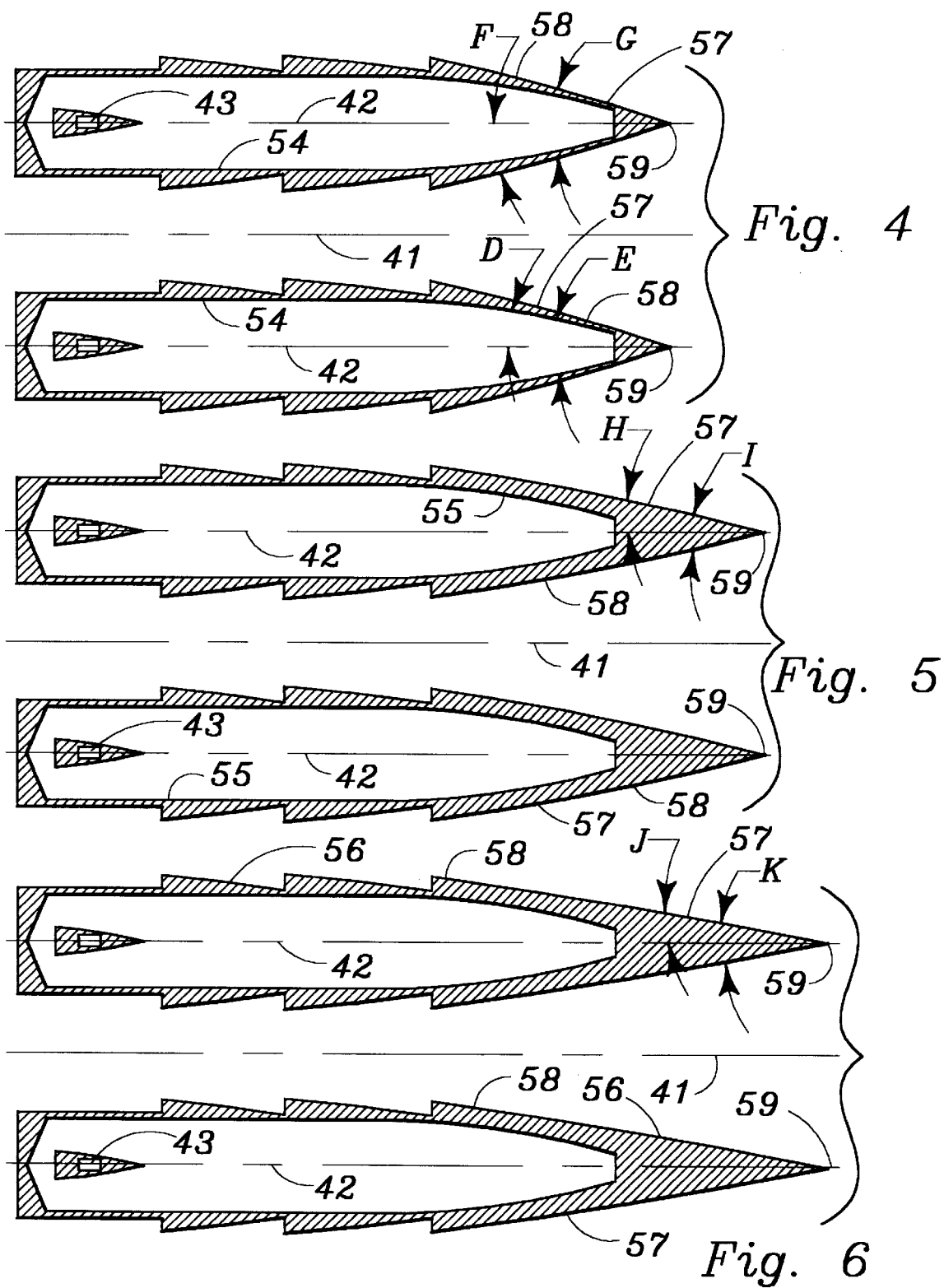

MULTIHULLED PARTIALLY AIR SUPPORTED MARINE VEHICLE

CROSS REFERENCE TO OTHER APPLICATIONS

This application is a continuation-in-part to applicant's earlier applications, Ser. No. 728,887 filed Jul. 10, 1991 now U.S. Pat. No. 5,176,095 issued Jan. 5, 1993; Ser. No. 871,387 filed Apr. 21, 1992 now abandoned; Ser. No. 151,253 filed Nov. 12, 1993 now U.S. Pat. No. 5,415,120 issued May 16, 1995; Ser. No. 283,647 filed Aug. 1, 1994 now abandoned; Ser. No. 347,859 filed Dec. 1, 1994 now abandoned; Ser. No. 468,876 filed Jun. 6, 1995 and now U.S. Pat. No. 5,611,294 issued Mar. 18, 1997; and Ser. No. 483,791 filed Jun. 7, 1995 and now U.S. Pat. No. 5,626,669 issued May 6, 1997.

FIELD OF THE INVENTION

This invention relates to multiple hulled marine vehicles that are partially supported by artificially pressurized gas cushions. There are numerous refinements to the invention that, in addition to other significant advantages over the prior art, define the instant invention advanced marine vehicle as having multiple hulls with built in recesses that restrain the upper portions of the pressurized gas cushions.

BACKGROUND OF THE INVENTION

This invention is a further improvement upon and definition of applicant's earlier inventions in this field. These include applicant's issued U.S. Pat. Nos. 5,176,095 and 5,415,120 that show multiple hulled air cushioned marine vehicles. The instant invention presents further important developments and definitions to the technology over those earlier.

Applicant has determined that very fine entry bows with defined limitations on the angle of the divergence of the multiple supporting hulls greatly aids ride qualities of his invention. It was found that divergence angles of less than twenty-six (26) degrees of the recess sidekeels and of the sides of the multiple supporting hulls are necessary for good ride qualities with angles of less than (nineteen) 19 degrees actually preferred. This is described and defined in some detail in this application covering the instant invention.

German patent DE 3813-105-A shows a non-pressurized air cushioned catamaran sidehull that has a series of parallel transverse steps in its undersurface that trap air bubbles. DE 3813-105-A has longitudinally parallel ridges (sidekeels) and certainly not the lower sidehull surface wave slicing diverging sidekeels of applicant's instant invention. Further, DE 3813-105-A does not have a recess aft seal that, as seen in a vertical transverse plane of the sidehull, is angled to vertical over a majority of its width as is an important feature of applicant's instant invention to insure best ride qualities in rough seas. Sundquist, U.S. Pat. No. 3,606,857, offers a catamaran hull that has an open trough in the underside of each catamaran sidehull. Sundquist has no aft seal of any kind or shape as his intent is to propel his hull by having pressurized air expel freely from the aft end of each sidehull recess. FIG. 6 of Sundquist shows a cross sectional view through one of his sidehulls where the upper portions of his gas cushion recess is curved over a majority of its width; however, that cross section is taken proximal the bow of his sidehull so it bears no relation to or use as the preferred recess aft seal of applicant's invention that is angled to horizontal, as seen in a vertical transverse plane of the sidehull, over a majority of its width. The reason that the instant invention angles the shape of his recess aft seal in such manner is to reduce the impact of waves that have traveled the length of his sidehull gas cushion, Therefore, Sundquist's gas cushion recess shape near his bow has no bearing on the shape of the instant invention's recess aft seal.

The instant invention also offers water deflecting steps inset into the sides of his sidehulls that are more vertically than horizontally oriented at their forward portions as can be seen in FIG. 2 of this application. This differs extensively from the water deflecting guides or projections of Rook, U.S. Pat. No. 527,511, that, on average, are much more horizontally oriented over their forward portions and more importantly are not inset into the sides of his boat hull. Rook's guides or projections actually extend outwardly from adjacent lower portions of his hull and actually drive the water away from the hull whereas the instant invention has inset steps so that water will just cease contact with the sides of the hull over the inset portion of the steps as such water simply becomes free of hull contact at the forward portion of the inset step.

de Pingon, French Patent 0 271 372 offers a catamaran air cushioned boat; however, his air cushion recess sidekeels 9, 10 diverge rearward from their intersection point 11 at a total divergence angle of approximately 45 degrees. This also shows the divergence of the sides of his supporting hulls as being in the 45 degree total divergence area. de Pingon's high sidekeel and side surface divergence angles are totally unacceptable for good ride qualities. Applicant has further defined over de Pingon and the other prior art by way of other important features of his instant invention.

SUMMARY OF THE INVENTION

The object of the instant invention is to provide advantages of applicant's previous multi-hulled air cushioned vehicles coupled with further improvements to ride qualities that are largely brought about by cleanly defined bow shapes that must be adhered to for good ride qualities.

A related object of the invention is that with the bow of a supporting multihull submerged by a defined angle as a function of waterline length, there is a clear limitation on the divergence angle going aft from the bow of recess sidekeels from each other and of the sides of the supporting multihull from each other for acceptable rough water ride qualities. Twenty-six degrees is considered an upper limit with twenty degrees a better comfort level limit.

It is a further object of the invention that any divergence of the recess sidekeels or of the sides above the recess sidekeels does not have to be symmetrical about a vertical centerline plane of a supporting hull.

It is a directly related object of the invention that a cross section of the supporting hull is not required to be symmetrical about a vertical transverse plane of the hull.

It is a related object of the invention that further submergence of the multihull bows, as occurs when passing through large waves, still requires similar limitations on sidekeel and side divergence angles of the supporting multihull to allow a knifing of the supporting multihull through such large waves with minimum shock or impact loads to the hulls.

A further object of the invention is that the recess sidekeels and outboard surfaces of the supporting hulls can include water deflecting steps with such water deflecting steps best applied at higher vehicle speed to length ratios.

A directly related object of the invention is that, at mid-range vehicle speed to length ratios, recess sidekeels and outboard surfaces can be of simple hard chine planing design.

It is a further directly related object of the invention that, at lowest vehicle speed to length ratios, the recess sidekeels are preferably of curvilinear shape to minimize water contact area as well as turbulence generation.

Yet another object of the invention is that a recess aft seal be employed to restrict gas flow leakage aft, provide a structure for installation of propulsors, and, by means of its shape, insure a good ride in rough seas.

It is a directly related object of the invention that, as seen in a vertical transverse plane of the hull, the recess aft seal preferably has a shape that is angled to horizontal over a majority of its width.

Another directly related object of the invention is that the recess aft seal can have an inverted-V shape.

Another object of the invention is that a downwardly extending pylon that is normally at least partially airfoil shaped can be installed in way of the recess aft seal to aid in obtaining clean water that has reduced amounts of entrained air from the gas cushion for waterjet propulsor.

Use of a similar downwardly extending pylon shape can be made when propellers, such as surfacing propellers, are installed aft of such pylon whereby such pylon deflects water with heavy amounts of entrained air away from the propeller.

The invention will become better understood upon reference to the drawings and the detailed description of the invention which follow in which:

FIG, 2 is a profile view of the instant invention showing several, A, B, and C, submergence levels of the bow that occurs when operating in waves or when trimmed down by the bow.

Figure 3:
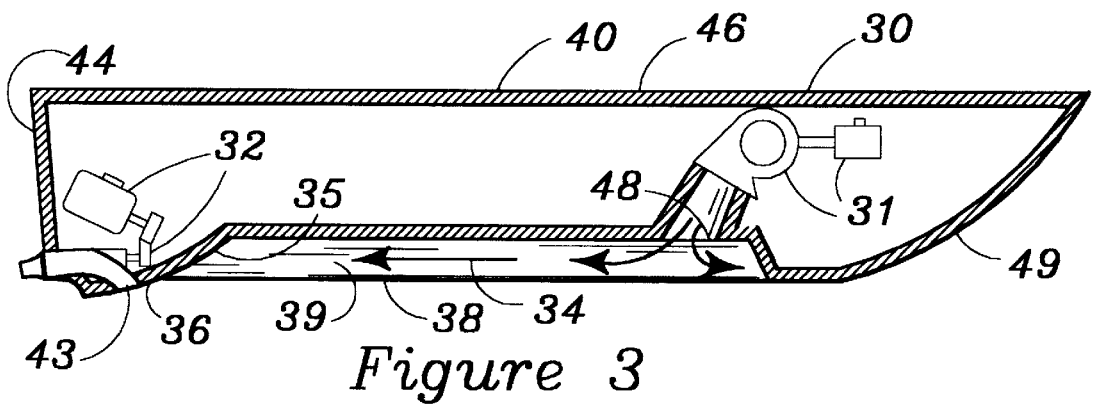

FIG. 3 is a view, taken through a vertical centerline plane of a supporting catamaran hull, that shows a waterjet propulsor and inlet in a pylon, recess aft seal, gas cushion recess, and blower.

Figure 2:
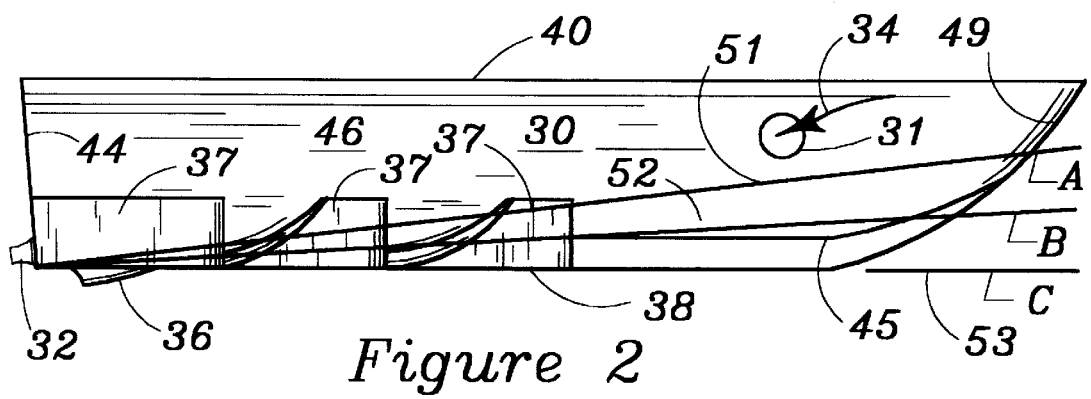

FIG. 4 presents a waterplane outline, as seen in a calm sea waterline with the gas cushion pressurized, of the optimum C submergence level shown in FIG. 2.

FIG. 5 is a waterplane outline, as seen in a calm sea waterline with the gas cushion pressurized, of the condition B submergence level shown in FIG. 2.

FIG. 6 gives a waterplane outline, as seen in a calm sea waterline with the gas cushion pressurized, of the condition A submergence level shown in FIG. 3.

Figure 1:
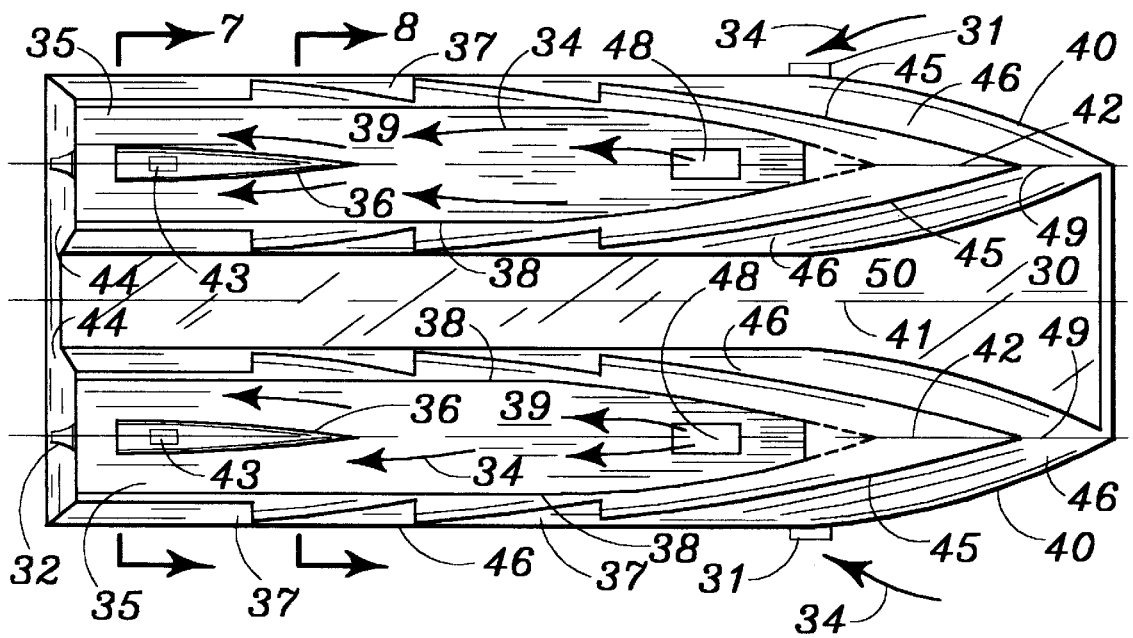
FIG. 1 presents a bottom plan view of a catamaran version of the instant invention showing the fine entry of the recess as well as the chine area at the bow. Other features of the invention including sidesteps and a downwardly extending pylon used to provide clean water to a waterjet propulsor are also shown.
Figure 7:
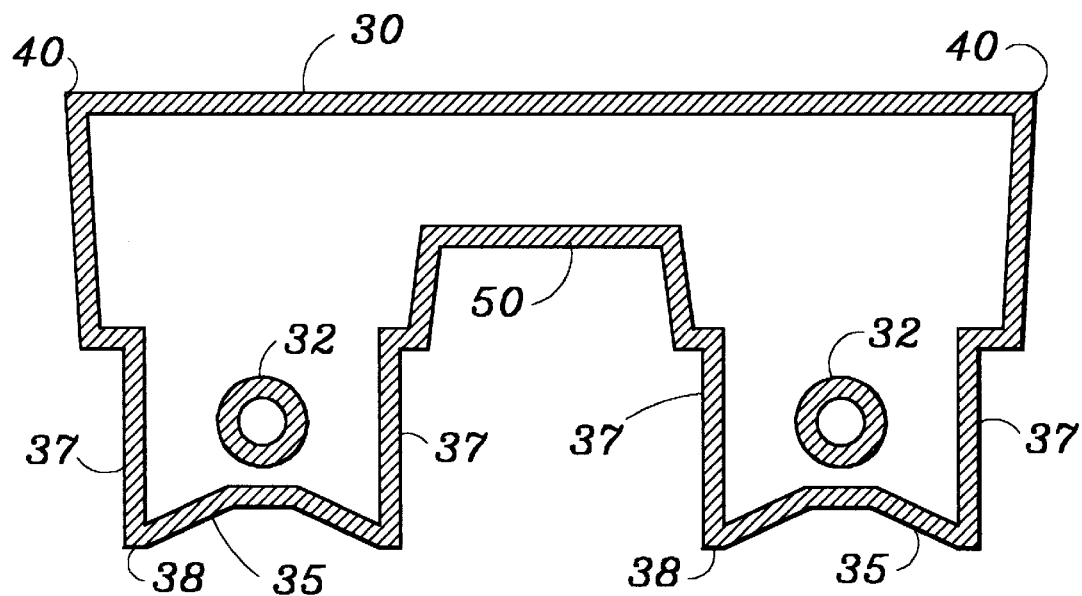

FIG. 7 presents a cross section, as taken through line 7—7 of FIG. 1, that shows details of the gas cushion recess aft seal in its preferred inverted-V configuration.

Figure 8:
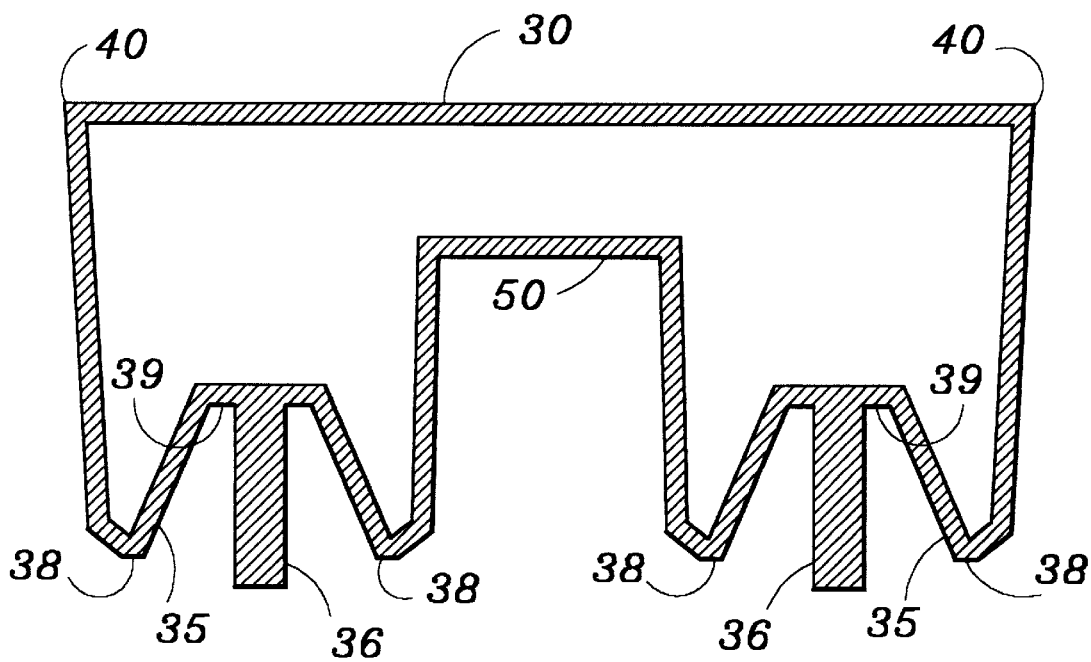

FIG. 8 is a cross section, as taken through line 8—8 of FIG. 1, that shows preferred shape of the gas cushion recess aft seal near its forward portion and that also shows a forward portion of a downwardly extending pylon upstream of its waterjet propulsor water inlet.

DETAILED DESCRIPTION

FIG. 1 presents a bottom plan view of the inventive hull 30 that shows a catamaran arrangement with two supporting hulls 46. Note the fine entry bows of these hulls that are essential for good ride qualities in rough seas. Note also the fact that each supporting hull 46 is essentially boat shaped with more narrow bows 49 than sterns 44 and separated from each other by connecting structure or wetdeck 50. Note that, while not shown, more than two supporting hulls can be used with one additional hull on the main hull centerline 41 an attractive arrangement. Additional supporting hulls to those shown can be either with a gas cushion recess as shown in the catamaran supporting hulls shown here or as more standard hulls less a gas cushion recess.

Other items shown are the chines 45, main hull vertical centerline plane 41, supporting hull vertical centerline planes 42, blower discharge 48, chines 45, air flow arrows 34, waterjet inlets 43, downwardly extending pylon 36, recess aft seal 35, propulsors 32, stern or transom 44, sidekeels 38, water deflecting steps 37, blower air inlets 31, and sides of supporting hulls 46.

FIG. 2 offers a profile view of the inventive hull 30 that shows calm sea A waterline 51, calm sea B waterline 52, and calm sea C waterline 53 that are used for illustration of different bow 49 submergences in calm seas. The C waterline 53 is, of course, the least resistance case and illustrates a condition where the supporting hull keels 38 are flat with or even with the calm water surface. The B waterline 52 represents a two and three tenths (2.3) degree angle of a calm sea waterline going from the keel 38 at the stern 44 to the bow. This represents for a vehicle with a 100 foot waterline a depth of submergence of the bow of four (4) feet. This is made to represent an encounter with a four (4) foot wave. Using the same terminology, the A waterline 51 uses a four and six tenths (4.6) degree angle which corresponds to an eight (8) font wave at the bow. FIG. 2 also shows that the sidehull water deflecting steps 37 are, at least in their majority, inset into the sides of the hull, and further are oriented more vertically than horizontally over their forward portions.

FIG. 3 is a, cross sectional view, as taken through a vertical centerline plane of a supporting hull 46 that shows the blower system 31, propulsor 32, waterjet inlet 43, and pylon 36. Note that other propulsor types including surfacing or standard underwater propellers can be used and in each case the pylon shown is valuable to direct water with air entrained away from the propulsor.

FIG. 4 shows the water contacting hull sections or C waterplane 53 as seen in a calm sea surface waterline, for the C waterline 53. Note that this has the least wetted area contact and hence the least resistance. Angle G represents the total divergence angle of the supporting hull's outside surfaces or sides 57 in that plane and angle F the partial angle, as measured from a vertical centerline plane 42 of the supporting hull. Note that angle G is defined as being on average less that a maximum of 26 degrees with less than 20 degrees preferred for best ride qualities. The total average divergence angle of a supporting hull's outside surfaces 57 from each other over a forward enlarging portion 58 of a supporting hull is defined as occurring over a forward enlarging portion 58 that goes aft from a supporting hull's bow 59 to where said forward enlarging portion 58 reaches a substantially maximum width. Angle E is the total divergence angle of the recess sidekeels and is defined as being less than 26 degrees with less than 20 degrees preferred also. Angle D is the partial angle as measured from a vertical centerline plane 42. Note that angle D does not have to be one half of angle E and angle F does not have to be one half of angle G as the supporting hulls can be non-symmetrical in some situations. Note also that it is a preferred embodiment of the invention that the divergence of the secondary hull sidekeels shall occur over more than twenty-five (25) percent of said secondary hull's waterline length and then become more parallel.

FIG. 5 is a similar view as given in FIG. 6 but with the B waterplane 55. Angle I is the total divergence angle and angle H the partial divergence angle. The defining angle for maximum total divergence angle I is 26 degrees with a lesser value of 20 degrees preferred.

FIG. 6 is a similar view to that given in FIG'S 4 and 5 but for the A waterplane 56 where the supporting hull bow is most deeply submerged. The defining angles for the K total divergence angle is a maximum of 26 degrees with the preferred being a maximum of twenty 20 degrees for best ride qualities.

FIG. 7 presents a cross section, as taken through line 7—7 of FIG. 1, that shows details of the gas cushion recess aft seal 35 in its preferred inverted-V configuration. Also to be noted are portions of the waterjet propulsors 32.

FIG. 8 is a cross section, as taken through line 8—8 of FIG. 1, that shows preferred shape of the gas cushion recess aft seal 35 near its forward portion and that also shows a forward portion of a downwardly extending pylon 36 upstream of its waterjet propulsor water inlet.

While the invention has been described in connecting with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. In an advanced marine vehicle with at least two supporting hulls that is partially supported by pressurized gas cushions where the gas cushions are restrained by gas cushion recesses built into undersides of said supporting hulls and a water surface and where said gas cushions are supplied with pressurized gas from artificial pressurization means, the improvement comprising:

the gas cushion recess in one of the supporting hulls is bordered, at least in part, by sidekeels and an aft gas restraining seal and, as seen in a calm sea surface waterline with the sidekeels proximal a bow of the supporting hull lower than the sidekeels proximal a stem of the supporting hull by up to two and three tenths (2.3) degrees, an average total divergence angle from each other of opposite outside surfaces of the supporting hull going aft from said supporting hull's bow over a forward enlarging portion of said supporting hull is less than twenty-six (26) degrees, lower portions of said sidekeels of the supporting hull, going aft from said supporting hull's bow diverge from each other over at least twenty five percent of a waterline length of said supporting hull, and the gas cushion recess enlarges in width over at least a part of its length going aft from a forward portion of said gas cushion recess.

2. The advanced marine vehicle of claim 1 wherein, as seen in the calm sea surface waterline with the sidekeels proximal the supporting hull's bow lower than the sidekeels proximal the supporting hull's stem by up to our and six tenths (4.6) degrees, the average total divergence angle from each other of opposite outside surfaces of the supporting hull going aft from said supporting hull's bow over the forward enlarging portion of said supporting hull is less than twenty-six (26) degrees.

3. The advanced marine vehicle of claim 2 wherein, at the four and six tenths (4.6) bow submergence angle, the average total divergence angle from each other of outside surfaces of said supporting hull going aft from said supporting hull's bow over the forward enlarging portion of said supporting hull is less than twenty (20) degrees.

4. The advanced marine vehicle of claim 1 wherein said recess aft gas restraining seal, as seen in a vertical transverse plane of the supporting hull, is angled to horizontal over a majority of its width.

5. The advanced marine vehicle of claim 4 wherein said aft gas restraining seal of the supporting hull, as seen in a vertical transverse plane of the supporting hull, has, at least in part, an inverted-V shape.

6. The advanced marine vehicle of claim 1 which further comprises water deflecting steps inset into at least one of the outside surfaces of the supporting hull.

7. The advanced marine vehicle of claim 1 which further comprises a pylon that extends downwardly so that its lower portion is lower than the sidekeels of the supporting hull whereby said pylon includes a waterjet propulsor water inlet.

8. The advanced marine vehicle of claim 1 wherein the sidekeels bordering a forward portion of the gas cushion recess in the supporting hull, as seen in the calm sea surface waterline with the gas cushion recess pressurized with gas, on average diverge from each other by less than twenty-six (26) degrees going aft from the forward portion of the gas cushion recess in the supporting hull to where the sidekeels become more parallel over their aft portions.

9. The advanced marine vehicle of claim 1 wherein the sidekeels bordering a forward portion of the gas cushion recess in the supporting hull, as seen in the calm sea surface waterline with the gas cushion recess pressurized with gas, on average diverge from each other by less than twenty (20) degrees going aft from the forward portion of the gas cushion recess in the supporting hull to where the sidekeels become more parallel over their aft portions.

10. The advanced marine vehicle of claim 1 wherein the sidekeels bordering the forward portion of the gas cushion recess in the supporting hull, as seen in the calm sea surface waterline with the gas cushion pressurized, on average diverge from each other over at least twenty-five (25) percent of a waterline length of said supporting hull going aft from the forward portion of the gas cushion recess in the supporting hull to where said sidekeels become more parallel over their aft sections.

11. The advanced marine vehicle of claim 1 wherein, at the two and three tenths (2.3) degree bow submergence angle, the average total divergence angle from each other of outside surfaces of said supporting hull going aft from said supporting hull's bow over the forward enlarging portion of said supporting hull is less than twenty (20) degrees.

12. The advanced marine vehicle of claim 1 wherein said water deflecting steps are oriented more vertically than horizontally over their forward portions.

13. In an advanced marine vehicle with at least two supporting hulls that is partially supported by pressurized gas cushions where the gas cushions are restrained by gas cushion recesses built into undersides of said supporting hulls and a water surface and where said gas cushions are supplied with pressurized gas from artificial pressurization means, the improvement comprising:

the gas cushion recess in one of the supporting hulls is bordered, at least in part, by recess gas cushion restraining sidekeels and a recess aft gas restraining seal wherein lower portions of the recess gas cushion restraining sidekeels, as seen in a calm sea surface waterline with the gas cushion pressurized, on average diverge from each other over at least twenty-five (25) percent of a waterline length of said supporting hull going aft from a forward portion of the gas cushion recess in the supporting hull to where said sidekeels become more parallel over their aft portions, and wherein said recess aft gas restraining seal, as seen in a vertical transverse plane of the supporting hull, is angled to horizontal over a majority of its width.

14. The advanced marine vehicle of claim 13 wherein, as seen in a calm sea surface waterline and with recess sidekeels proximal a bow of the supporting hull lower than recess sidekeels proximal a stem of the supporting hull by an angle of up to two and three tenths (2.3) degrees, outside surfaces of said supporting hull going aft from the supporting hull's bow over a forward enlarging portion of said supporting hull diverge from each other at an average total divergence angle of less than twenty-six (26) degrees.

15. The advanced marine vehicle of claim 13 wherein, as seen in the calm sea surface waterline and with recess sidekeels proximal a bow of the supporting hull lower than recess sidekeels proximal a stem of the supporting hull by an angle of up to two and three tenths (2.3) degrees, outside surfaces of said supporting hull going aft from the supporting hull's bow over a forward enlarging portion of said supporting hull diverge from each other at an average total divergence angle of less than twenty (20) degrees.

16. The advanced marine vehicle of claim 13 therein, as seen in the calm sea surface waterline and with recess sidekeels proximal a bow of the supporting hull lower than recess sidekeels proximal a stem of the supporting hull by an angle of up to four and six tenths (4.6) degrees, outside surfaces of said supporting hull going aft from the supporting hull's bow over a forward enlarging portion of said supporting hull diverge from each other at an average total divergence angle of less than twenty-six (26) degrees.

17. The advanced marine vehicle of claim 13 wherein, as seen in the calm sea surface waterline and with recess sidekeels proximal a bow of the supporting hull lower than recess sidekeels proximal a stem of the supporting hull by an angle of up to four and six tenths (4.6) degrees, outside surfaces of said supporting hull going aft from the supporting hull's bow over a forward enlarging portion of the supporting hull diverge from each other at an average total divergence angle of less than twenty (20) degrees.

18. The advanced marine vehicle of claim 13 wherein the sidekeels bordering the forward portion of the gas cushion recess in the supporting hull, as seen in the calm sea surface waterline with the gas cushion recess pressurized with gas, on average diverge from each other by less than twenty-six (26) degrees going aft from the forward portion of the gas cushion recess in the supporting hull to where the sidekeels become more parallel over their aft portions.

19. The advanced marine vehicle of claim 13 wherein the sidekeels bordering the forward portion of the gas cushion recess in the supporting hull, as seen in the calm sea surface waterline with the gas cushion recess pressurized with gas, on average diverge from each other by less than twenty (20) degrees going aft from the forward portion of the gas cushion recess in the supporting hull to where the sidekeels become more parallel over their aft portions.

20. The advanced marine vehicle of claim 13 which further comprises water deflecting steps inset into outer surfaces of one of the supporting hull sidekeels whereby said water deflecting steps are oriented more vertically than horizontally over their forward portions.

21. In an advanced marine vehicle with at least two supporting hulls that is partially supported by pressurized gas cushions where the gas cushions are restrained by gas cushion recesses built into undersides of said supporting hulls and a water surface and where said gas cushions are supplied with pressurized gas from artificial pressurization means, the improvement comprising:

the gas cushion recess in one of the supporting hulls is bordered, at least in part, by sidekeels and an aft gas restraining seal and, as seen in a calm sea surface waterline with the sidekeels proximal a bow of the supporting hull lower than the sidekeels proximal a stem of the supporting hull by up to two and three-tenths (2.3) degrees, an average total divergence angle from each other of opposite outside surfaces of the supporting hull going aft from said supporting hull's bow over a forward enlarging portion of said supporting hull is less than twenty-six (26) degrees and wherein the recess sidekeels bordering a forward portion of the gas cushion recess in the supporting hull, as seen in the calm sea surface waterline with the gas cushion recess pressurized with gas, on average diverge from each other going aft from a recess forward portion, said gas cushion recess enlarges in width over at least a part of its length going aft from its forward portion, and lower portions of said sidekeels diverge going aft from their forward portions over at least twenty five percent of a waterline length of said advanced marine vehicle.

22. The advanced marine vehicle of claim 2 said recess aft gas restraining seal, as seen in a vertical transverse plane of the supporting hull, is angled to horizontal over a majority of its width.

23. The advanced marine vehicle of claim 21 which further comprises water deflecting steps inset into outer surfaces of one of the supporting hull sidekeels whereby said water deflecting steps are oriented more vertically than horizontally over their forward portions.

* * * * *